United States Patent [19]

Haukaas

[11] Patent Number: 4,913,241
[45] Date of Patent: Apr. 3, 1990

[54] ROD WEEDER ATTACHMENT FOR AN AGRICULTURAL IMPLEMENT

[76] Inventor: Duane Haukaas, Box 8, Morlach, Saskatchewan, Canada, S0H 3E0

[21] Appl. No.: 298,932

[22] Filed: Jan. 23, 1989

[51] Int. Cl.⁴ .............................................. A01B 39/19
[52] U.S. Cl. ........................................ 172/44; 172/106
[58] Field of Search ..................... 172/44, 68, 69, 76, 172/105, 106, 125, 705; 111/52, 85

[56] References Cited

U.S. PATENT DOCUMENTS

| | | | |
|---|---|---|---|
| 1,531,526 | 3/1925 | Thomas | 172/44 |
| 2,699,714 | 1/1955 | Fundingsland | 172/44 |
| 2,862,433 | 12/1958 | Guyer | 172/44 |
| 2,892,504 | 4/1959 | Mowbray | 172/44 |
| 3,140,678 | 7/1964 | Morris | 111/67 |
| 3,190,363 | 6/1965 | Morris | 172/44 |
| 3,194,321 | 7/1965 | Sande | 172/44 |
| 3,550,689 | 12/1970 | Keck | 172/44 |
| 3,552,496 | 12/1970 | Tasset | 172/44 |
| 3,651,870 | 3/1972 | Calkins | 172/44 |
| 3,661,101 | 5/1972 | Parsons | 111/69 |
| 3,768,425 | 10/1973 | Seifert, Jr. | 111/85 |
| 3,804,179 | 4/1974 | Johnson | 172/510 |
| 4,206,814 | 6/1980 | Isaacs | 172/44 |
| 4,259,872 | 4/1981 | Chandler | 172/106 X |
| 4,396,068 | 8/1983 | Handy | 172/44 |
| 4,690,223 | 9/1987 | Haukaas | 172/44 |

Primary Examiner—Randolph A. Reese
Assistant Examiner—Jeffrey L. Thompson
Attorney, Agent, or Firm—Adrian D. Battison; Stanley G. Ade; Murray E. Thrift

[57] ABSTRACT

A rod weeder attachment including a clamp arrangement for mounting upon a tool bar of an agricultural implement, an arm which extends rearwardly from the clamp and is spring biased downwardly toward the ground, a ground wheel mounted upon the rear end of the arm which is a peripheral surface for running upon the ground and for defining the height of the arm above the ground, a pair of shanks which extend downwardly from the arm, a rod support on a lower end of the shanks in bearings which allow rotation of the rod about its axis and a drive arrangement which communicates drive from the ground wheel to the rod to rotate the rod as it moves through the ground. The arm is formed in two parts a rear part of which carries the ground wheel and is freely pivotal. The free pivot action of the rear part allows the ground wheel to move forwardly when inoperative so that its periphery is below the level of the rod. The rear part can also move rearwardly and upwardly in a pivot action caused by forward movement of the implement so that the rod moves against the ground and its depth is controlled by a rear limit stop against which the rear part engages. The rotation of the ground wheel caused by its initial engagement with the ground drives the rod so that the rod when it engages the ground is rotating and properly enters the ground.

13 Claims, 3 Drawing Sheets

ROD WEEDER ATTACHMENT FOR AN AGRICULTURAL IMPLEMENT

BACKGROUND OF THE INVENTION

This invention relates to a tillage attachment for mounting on an agricultural implement of the type comprising a tool bar, ground wheels for supporting the tool bar for movement across the ground and means for causing the tool bar to move in a direction transverse to its length.

Rod weeders are known and are conventional agricultural implements. These generally comprise a tool bar mounted upon ground wheels and attached to a hitch for movement of the tool bar across the ground. The rods are then attached to the tool bar on shanks which extend downwardly from the tool bar with the rods parallel to the tool bar and mounted on bearings at the lower end of the shanks. A number of separate rods can be arranged across the tool bar to match the full length of the tool bar. The rod or each of the rods is then driven by suitable mechanism so that it rotates about a longitudinal axis in a reverse direction relative to a normal rolling direction. Such a device is intended to work just below the soil surface to cut weeds and to lift the weed parts to the surface of the soil where they wither and die.

Rod weeders of this conventional type have been well known for many years and have been manufactured and sold in large numbers. However, they have a number of significant disadvantages, the most important of these being that as the level of the ground varies relative to the tool bar due to any local changes in surface height, the depth of the rod relative to the surface of the ground significantly varies and unless the rod is working at exactly the right depth, its effectiveness is seriously reduced.

My prior U.S. Pat. No. 4,690,223 discloses a rod weeder attachment which includes a clamp arrangement for mounting upon a tool bar of an agricultural implement, an arm arrangement which extends rearwardly from the clamp arrangement and is spring biased downwardly toward the ground, a ground wheel mounted upon the rear end of the arm which has a peripheral surface for running upon the ground and for defining the height of the arm above the ground, a pair of shanks which extend downwardly from the arm, a rod supported on the lower end of the shanks in bearings which allow rotation of the rod about its axis and a drive arrangement which communicates drive from the ground to the rod to rotate the rod as it moves through the ground.

This arrangement was designed to provide accurate control of the depth of the rod in the ground since the ground wheel runs on the surface of the ground and thus accurately controls the height of the arm and the rod which is coupled to the arm by the rigid shanks. The rod is thus of a limited length and is controlled accurately by its ground wheel.

One problem which has however arisen from the design disclosed in my above patent is that of starting the operation of the device. As in the previous design the ground wheel is necessarily above the level of the rod, when the arm is lowered toward the ground in a start up process, the rod firstly engages the ground and holds the wheel above the ground. As the attachment is moved forward there is no drive to the rod since the ground wheel remains above the ground and hence the rod in many cases encounters difficulty in entering the ground to commence proper operation.

SUMMARY OF THE INVENTION

It is one object of the present invention, therefore, to provide an improved design of the rod weeder attachment which enables the device to be started in its initial operation more readily.

According to the invention, therefore, there is provided a tillage attachment device for mounting on an agricultural implement of the type comprising a tool bar, ground wheels for supporting the tool bar for movement across the ground and means for causing the tool bar to move in a direction transverse to its length, the device comprising clamp means for attachment of the device to the tool bar, pivot arm means mounted on said clamp means so as to extend rearwardly therefrom including a first portion extending from said clamp means so as to be pivotal about a horizontal axis at right angles to said arm means and a second rearward portion connected to the first portion at a rearward end thereof so as to extend downwardly therefrom, spring biasing means connected between said clamp means and said first portion of said pivot arm means for biasing said arm means downwardly around said axis, a ground engaging wheel having an axle mounted on said second portion of said arm means remote from said clamp means such that the ground wheel runs on the ground rearwardly of and following said tool bar, said ground wheel having a ground engaging periphery arranged to maintain said axle at a predetermined spacing from the ground, strut means rigidly mounted upon and extending transversely to said arm means, two horizontally spaced rigid shank means each rigidly mounted on said strut means and extending downwardly therefrom for engagement with the ground, a rod extending between said shank means at respective lower ends thereof, the position of the rod relative to the ground being controlled by the height of the first portion of the arm means above the ground, bearing means mounting said rod on each of said shank means for rotation relative thereto about a longitudinal axis of said rod, drive means for communicating drive from said ground wheel to said rod for rotating said rod, means mounting the second portion of the arm means on the first portion for free pivotal movement about an axis parallel to said horizontal axis from a first forward position, in which the angle between the first and second positions is a minimum, in which the axle and ground wheel are at a forwardly most extent and in which the length of the shank means relative to the length of the second portion is arranged such that a lowest point of the periphery of the ground wheel is below a horizontal plane containing the rod, to a predetermined second rearward position in which said angle is increased such that the ground wheel is above said horizontal plane by a distance equal to a predetermined required working depth of the rod in the ground, limit means preventing movement of the second portion beyond said second position and means biasing said second portion toward said first position.

The modification by which the second arm portion is provided to freely pivot relative to the first arm portion enables the wheel to pivot downwardly to a position beneath the level of the rod whenever the rod is raised from the ground. In this way the first part to engage the ground as the device is lowered is the ground wheel rather than the rod so that the ground wheel commences rotation of the rod as the device is moved forwardly. Forward movement tends to pivot the second portion of the arm rearwardly so the ground wheel moves backwardly and of course pivots upwardly to a position raised above the height of the rod until the second arm portion hits a limit stop. The limit stop is positioned so that the difference in height between the ground wheel and the rod is set at the predetermined required depth of operation of the rod. The rod is thus maintained at this depth by the engagement of the ground wheel on the surface, the engagement of the second arm portion against the stop and the control of the height of the arm above the ground by this fixed orientation of the second arm portion relative to the first arm portion.

The device is yet further improved relative to my previous design by a modification to the shape of the shank which does not carry the drive chain into a C-shaped arrangement.

The device is yet further improved relative to my previous design by the provision of a trip arrangement which enables a rod to lift from the ground against spring bias provided by way of a pivotal rear part of the first arm portion which allows the rod, ground wheel and second arm portion to pivot around a horizontal axis to a position raised from the ground.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
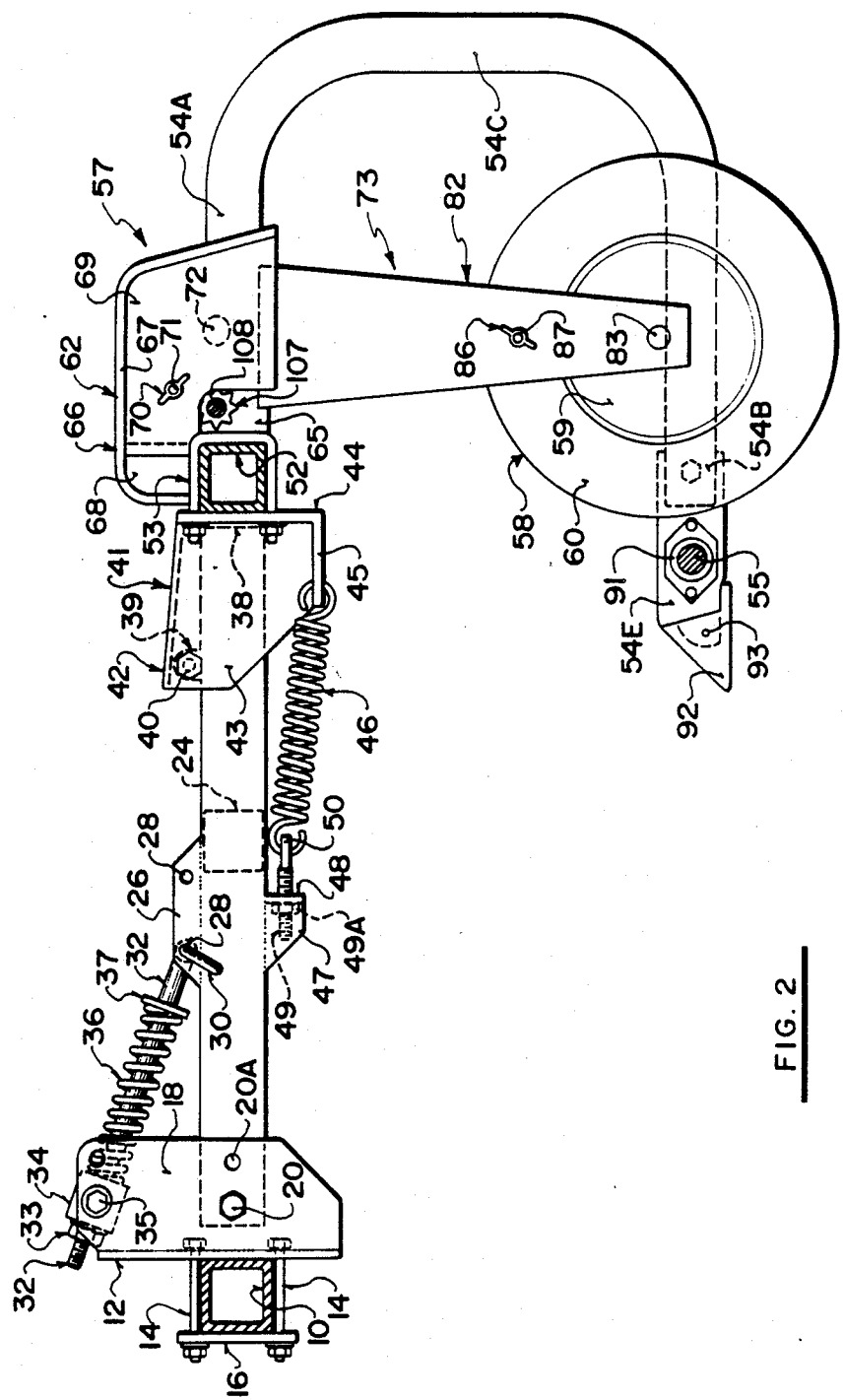
FIG. 2 is a cross sectional view along the lines 2—2 of FIG. 1 showing the tool bar of the implement.

In FIG. 2 the implement to which the attachment is mounted is indicated at 10 and for convenience of illustration only the tool bar thereof is shown in cross section; it will be appreciated that the tool bar comprises a portion of an agricultural implement including ground wheels for supporting the tool bar and various tools such as cultivator shanks for operating upon the ground.

The attachment comprises a pair of clamp members each including a vertical plate 12 which is attached to one face of the square tool bar 10 by bolts 14 and a retaining plate 16 on the opposed side of the tool bar 10. The vertical plate 12 is reinforced by a pair of side plates 18 to form a channel extending rearwardly from the tool bar.

The two side plates 18 of the channel provide two pairs of aligned holes for supporting a transverse pin 20 providing pivotal support for a rearwardly extending arm 22. The second pair of holes 20A allow the arm 22 to be mounted approximately 2 inches further out from the tool bar so that adjacent devices are not directly aligned which would cause interference. The arm is formed of a tubular material to provide sufficient strength for supporting the structure. A second identical arm is also pivotally mounted in the second channel so that the arms extend parallel to each other rearwardly from the tool bar. A transverse connecting beam 24 forms the arms into a rigid unit which is thus prevented from twisting about an axis longitudinal to the arms.

Figure 1:
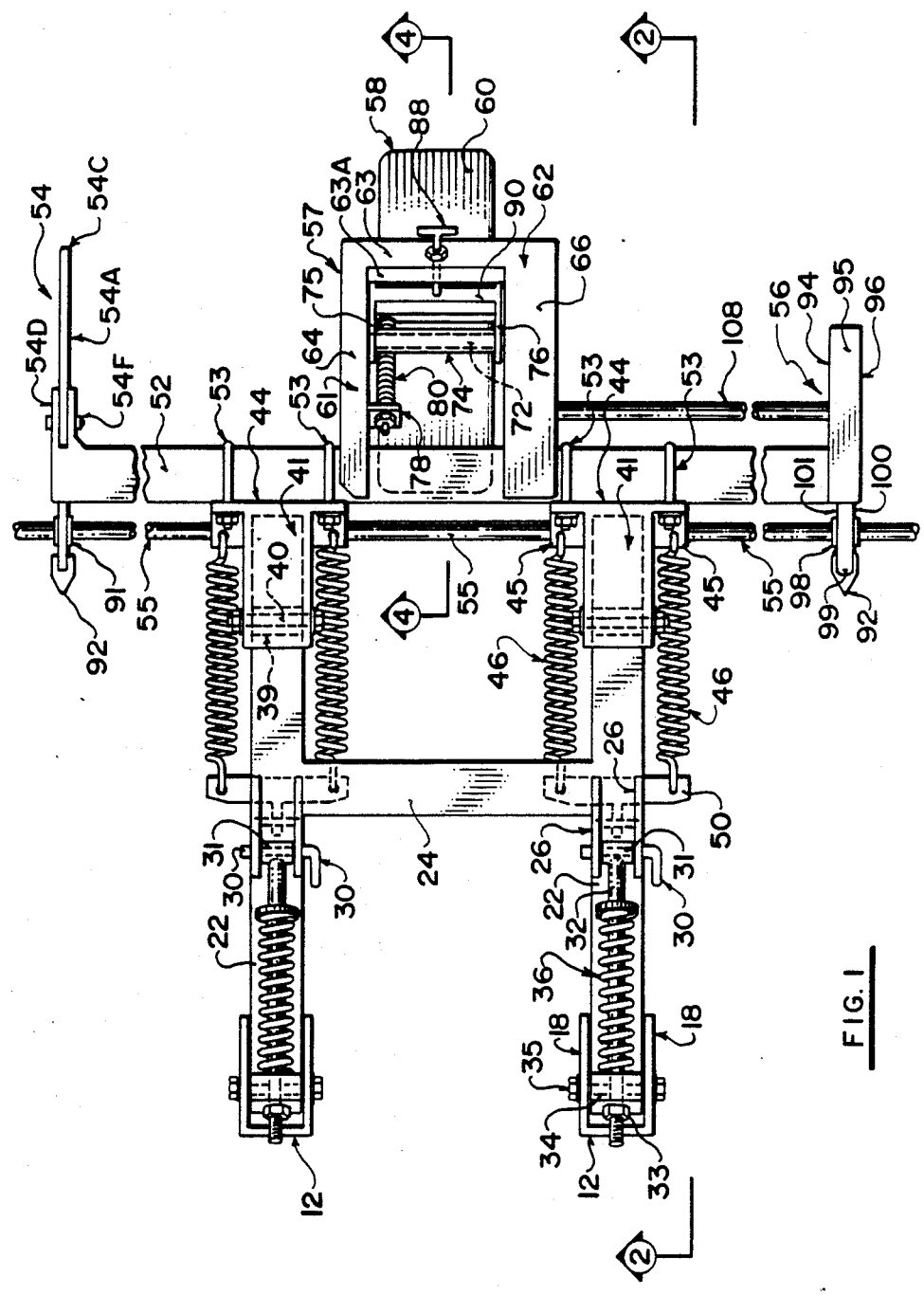
FIG. 1 is a top plan view of an attachment for a tool bar of an agricultural implement according to the invention.

Each of the arms includes on an upper face a pair of upwardly extending flanges 26 at a position spaced along the length of the arms from the pivot pin 20 by a distance approximately equal to one half of the length of the arms. The flanges provide two pairs of aligned transverse openings 28, each pair for receiving a pin 30 thereacross. One pair of the aligned openings can be selected with the first pair providing an operative position as shown in FIGS. 1 and 2 and the second pair of openings providing a raised position of the arms when the pin is positioned in the second pair. The pin is held in place by a transverse cotter pin (not shown) and attaches a sleeve 31 to the flanges at the selected location. The sleeve is welded to a longitudinal pin 32 which extends outwardly from the sleeve backwardly toward the channel defined by the side plates 18. The pin 32 has on its upper end a retaining nut 33 which engages an upper face of a sleeve 34 free to slide longitudinally along the pin 32 but prevented from movement relative to the channel plates 18 by a transverse pin 35. A spring 36 engages against the lower face of the sleeve 34 at one end and against a flange 37 fixed on the pin 32 at the other end. The spring is arranged to be under compression so that it acts to force the flange 37 and thus the pin 32 in a downward direction tending to cause the arms to be biased downwardly toward the ground up to a position determined by the retaining nut 33. When the pin 30 is transferred to the second pair of openings 28, the length of the pin 32 ensures that the arms 22 are moved to a raised position so as to hold the attachment raised relative to the tool bar and thus raised away from the ground in an inoperative position.

The arms 22 extend beyond the flanges 26 to an end face 38. At a position before the end face 38 is welded on the upper surface of each of the arms a sleeve 39 defining a transverse opening for receiving a pin 40. The pin 40 provides a pivot axis for a rear part of the arms defined by a channel member 41 having an upper surface 42 and sides 43 which surround the end portion of the arm 22. The channel member thus forms the rear part of the arm 22 and allows pivotal movement of the rear part about the horizontal axis defined by the pin 40 to allow the whole of the rear part of the implement to be raised away from the ground about the pivot pin 40 when required in a trip action. A rear end of the channel 41 is closed by a transverse plate 44 which in a lowered position of the channel member engages the end face 38 of the arm to locate the rear part of the arm at a required operating position forming in essence a structural part of the arm. A pair of horizontal plates 45 are provided with each welded between a lower edge of the plate 44 and a lower edge of the side 43 so as to extend outwardly to the sides of the rear part of the arm. The plates 45 provide a rear locating member for the end of a spring 46 which extends forwardly therefrom for engagement with a forward part of the arm 22. For this purpose the underside of the arm has welded thereto a U-shaped member with a pair of depending sides along the sides of the arm 47 and a cross flange 48. The cross flange supports one end of a threaded bolt 49 which has a nut 49A thereon for adjustment of the position of the bolt relative to the cross flange. The other end of the bolt is coupled to a transverse coupling plate 50 forming an attachment for the front end of the spring 46. As best shown in FIG. 1, the coupling plate 50 extends outwardly to each side of the arm 22 for connection to a respective one of a pair of the springs 46 with each of the springs being arranged on a respective side of the arm 22. The springs thus bias the rear part of the arm into the lowered position shown in FIG. 2 but are chosen to allow a tripping or cushion release action of the rear part of the arm under a force, adjustable by tightening or loosening the bolt 49, which is insufficient to cause damage to the equipment described hereinafter.

The two plates 44 thus provide a horizontal support surface for a main transverse beam 52 of the device which extends between the plates 44 and outwardly to the sides of the device. The main beam 52 is attached to the plates 44 by four U clamps 53 with each of the U clamps being arranged on a respective side of the rear part 42 of a respective one of the arms.

The main beam 52 carries at one end a C-shaped shank 54 for supporting a rod 55 of the attachment and carries at the other end a drive shank 56 which similarly supports the rod 55.

Centrally of the beam 52 is provided a second portion of the arm indicated at 57 which couples the beam to a ground wheel 58 for running over the ground in an action which causes driving of the ground wheel and which enables the height of the arm to be controlled by the engagement of the ground wheel over the surface of the ground. For this purpose the ground wheel is of the type including a hub 59 and an inflatable rubber tire 60 which includes a relatively flat peripheral surface with a suitable tread pattern for running smoothly over the surface of the ground and for frictionally engaging the ground.

Figure 4:
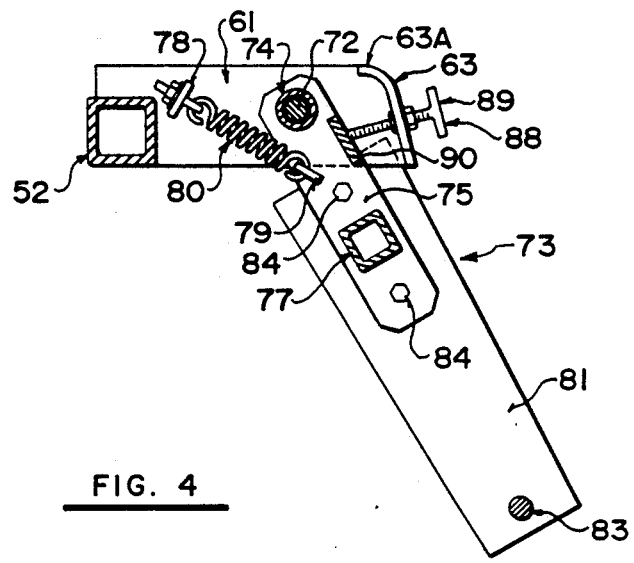
FIG. 4 is a cross sectional view along the lines 4—4 of FIG. 1 with the wheel omitted for convenience of illustration.

The arm portion 57 supporting the ground wheel relative to the main beam 52 includes a frame portion rigidly attached to the main beam and extending rearwardly therefrom and including a pair of sides 61 and 62 together with a cross member 63. The sides are spaced by the width approximately equal the width of the ground wheel 58. The side 61 comprises an upright plate welded to the beam 52 and a top flange 64 which is turned outwardly toward the respective end of the beam 52 to provide bending strength. The side 62 comprises a main vertical plate 65 which is similarly welded to the beam 52. The main plate 65 of the side 62 extends higher than the side 61 since it houses the drive system from the ground wheel as described hereinafter. The side 61 is best illustrated in FIG. 4 and the side 62 is best illustrated in FIG. 2. A covering flange 66 extends across the top edge of the whole of the plate 65 including a forward upwardly extending portion, a top horizontal portion and a rearward downwardly extending trailing portion. The top flange 66 includes narrow side flanges which are turned downwardly with the inner side flange being welded to the plate 65 and an outer side flange shown in FIG. 2 at 67 defining an outer face of the housing 62. The outer face is covered by a first fixed plate 68 and a removable plate 69 which is fastened by a wing nut 70 on a threaded pin 71 extending outwardly from the plate 65. The cross member 63 shown best in FIGS. 1 and 4 comprises a plate which has a rear surface extending downwardly and outwardly at the same angle as the rear end of the plates 61 and 65 together with an upper horizontal flange 63A welded along the upper edge of the plate 61 and to an inner face of the plate 65 at a position part way up the plate 65, the upper flange 63A providing strength to the structure.

A support rod 72 is bolted between the inner faces of the plates 61 and 65 in a horizontal direction to provide a pivot support for a pivotal wheel support structure defining a second or rear part of the arm and generally indicated at 73. The wheel support structure 73 includes a sleeve 74 which surrounds the rod 72 for pivotal movement around the rod 72. The sleeve is welded to a pair side plates 75 and 76 at the ends of the sleeve which are thus spaced just inside the inner surfaces of the plates 61 and 65. The plate 75 and 76 are connected at a position spaced downwardly from the sleeve 74 by a transverse tubular strut 77 so that the plates, sleeve and strut form a rectangular rigid structure extending downwardly from the rod 72 and pivotal around the rod 72. A lug 78 is welded to the inner face of the plate 61 at an angle thereto and extending inwardly between the rigid frame defined by the plates 61 and 65. A second lug 79 is welded on an inner surface of the depending plate 75 and a spring 80 is positioned between the lugs tending to pull the lugs toward one another to draw the wheel support structure 73 in a direction tending to move the wheel forwardly to a position underlying the beam 52 as shown in FIGS. 1 and 2.

The wheel support structure 73 further includes a pair of depending legs 81 and 82 each extending from and attached to a respective one of the depending plates 75 and 76 and including at its lower end a transverse axle 83 for supporting the ground wheel 58. The leg 81 comprises a flat plate with a right angle flange down each side to provide bending strength and extending in a direction outwardly away from the ground wheel. The leg 81 is attached to the respective depending plate 75 by a pair of bolts 84 arranged respectively above and below the transverse strut 77 thus fixing the leg 81 to move in the pivotal action simultaneously with the depending plate 75. The bolts 84 include spacers so that the plate 75 moves on the inside of the plate 61 while the plate forming the leg 81 moves on the outside of the plate 61.

Similarly the leg 82 is attached to the depending plate 76 for movement therewith by similar bolts 84 (not shown). The leg 82 as shown best in FIG. 2 includes a cover plate 85 attached to the back plate forming the leg 82 by way of a wing nut 86 threaded onto a pin 87 attached to the back plate. The cover 85 includes side flanges which engage around the outer surface of the side flanges of the back plate to form an enclosure for the ground wheel drive system.

An adjustable limit stop generally indicated at 88 is mounted on the cross member 63 of the frame as shown best in FIG. 4 and comprises a bolt 89 which can be screwed in and out and includes an end face for engaging a cross plate 90 attached to the depending side plates 75 and 76. The rearward movement of the wheel assembly is thus limited by the adjustable position of the bolt 89.

Figure 3:
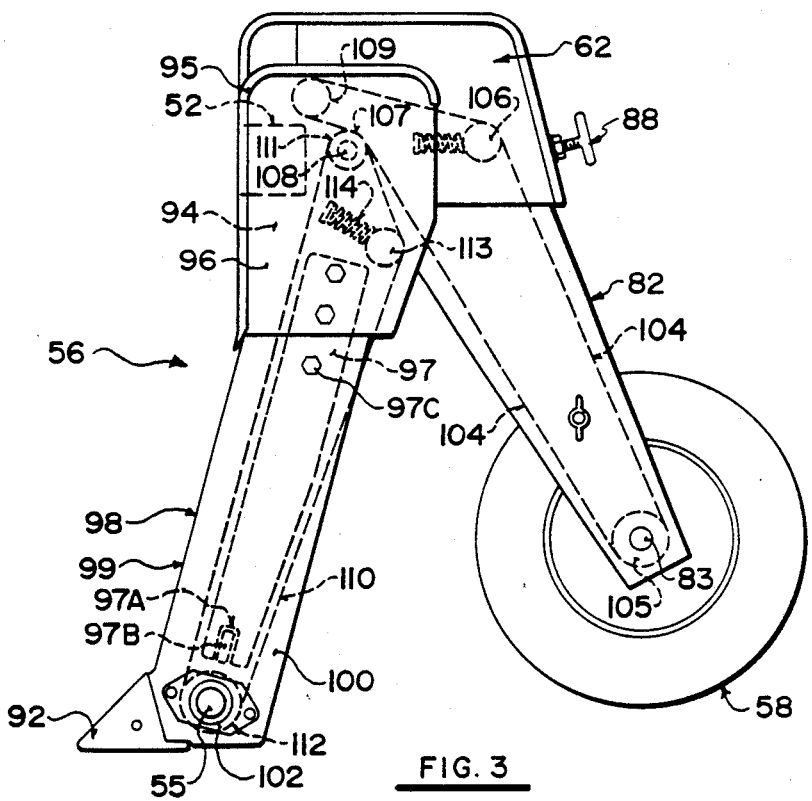
FIG. 3 is a side elevational view of the attachment of FIG. 1.

The shank 54 is shown in FIGS. 1 and 2 and is omitted from FIGS. 3 and 4 for convenience of illustration. The shank 54 comprises a C-shaped member having a substantially horizontal forwardly extending upper part 54A and a substantially horizontal forwardly extending lower part 54B interconnected by a smoothly curved central depending section 54C. The upper part 54A is clamped to the beam 52 between a pair of flanges 54D and 54E defining a rearwardly extending channel therebetween. The flange 54D is welded to the end face of the beam 52 to provide an end plate therefor. The shank is clamped between the flanges by a plurality of bolts one of which is indicated at 54F.

At a forward end of the lower part 54B is bolted a casting 54E including a recess for receiving the end of the part 54B. The casting carries a bearing 91 which rotatably supports the rod 55 for rotation about a horizontal axis longitudinal of the rod. Forwardly of the bearing 91 the casting carries a knife point 92 with a sharpened front edge which is inclined downwardly and forwardly from an upper part just above the bearing 91 to a lower most apex below the bearing 91 and defining a lower most edge for the shank. The width of the knife point at a trailing edge thereof is equal to or slightly greater than that of the bearing so that the knife protects the bearing and diverts the soil engaged by the shank around the bearing to reduce or prevent wear or damage on the bearing. The knife point 92 is attached to a front edge of the shank by a pin 93 so that the knife can be readily removed for replacement. The C-shape of the shank reduces ground resistance and allows the soil and uprooted plant life to flow more readily over the horizontal lower portion of the shank.

The shank 56 is shown in more detail in FIGS. 1 and 3. The shank comprises an end plate 94 welded on the end of the beam 52. Around the outer edge of the plate 94 is a side flange 95 similar to the flange 66 which extends around a front edge of the end plate 94, across the top and partly down the rear edge. A front cover plate 96 is attached over the front base of the housing defined by the backplate 94 and side flange 95 to enclose the drive system therein. A flat bar 97 is attached to the housing between the front plate 96 and the back plate 94 and extends downwardly therefrom generally along the axis of the shank. A lower portion of the shank 98 comprises a channel member with a smoothly curved front surface 99 and sides 100, 101. The flat bar 97 has a notch 97A cut across its lowermost end. The notch is arranged to receive a cross plate 97B welded between the sides 100, 101 of the channel member. The channel member has an upper end which is bolted to the rod 97 at a bolt 97C so that the channel member extends downwardly and slightly forwardly from the housing. The lower end of the channel member carries a bearing 102 similar to the bearing 91 which is mounted between the sides of the channel member. The bearing supports the rod 55 at a position directly in line with bearing 91 so that the rod can rotate about its axis as previously described. A point 92 substantially of the construction previously described but of increased transverse width is attached on the lowermost forward part of the channel member 98 at an identical position to and performing the same function as the point on the shank 54.

In FIG. 3, the drive system from the ground wheel 58 to the rod 55 is shown schematically. The drive system includes a chain 104 contained within the housing 82 driven by a sprocket 105 on the axle 83. The chain passes over a spring mounted tensioning sprocket 106 mounted within the housing 62 at a position substantially identical to the axis of the pivot rod 72 so that pivoting of the lower part of the wheel assembly does not significantly alter the tension in the chain. An outer edge of the chain 104 is wrapped over a chain wheel 107 which drives a rod 108 communicating drive from the wheel assembly to the shank 56. An idler sprocket 109 is provided for the chain 104 to complete the drive loop so that the rotation of the ground wheel causes the driving action on the rod 108. The drive system further includes a chain 110 within the shank 56. The chain cooperates with a sprocket 111 on the rod 108, a sprocket 112 on the rod 55 and a tensioning sprocket 113 mounted on a spring system 114. Thus rotation of the ground wheel directly drives rotation of the rod with the rod rotating in the opposite direction to the ground wheel that is rearwardly as the implement is pulled forwardly across the ground.

To commence operation of the device prior to engagement of the rod with the ground, the tool bar is raised above the ground during a transport mode. At the place on the ground where operation is intended to commence, the tool bar is lowered by the implement itself (the details of which are not shown) to a position where the attachment according to the invention initiates contact with the ground. While the device is raised, the weight of the ground wheel together with the operation of the spring 80 causes the ground wheel to pivot about the rod 72 to take up a position in which it is substantially directly beneath the rod 72 as shown in FIGS. 1 and 2. In this position the lower most edge of the ground wheel is below the vertical height of the rod 55 so that the first part of the attachment engaging the ground is the ground wheel itself. As the implement commences forward movement, this forward movement causes the ground wheel to rotate in contact with the ground thus providing driven rotation of the rod 55. The forward movement also tends to cause the ground wheel to be pushed backwardly so that the lower part of the ground wheel assembly pivots about the rod 72 with the ground wheel thus moving rearwardly and upwardly around an arc of the circle with the centre on the rod 72. The strength of the springs 36 and 80 is selected so that the forward movement of the implement causes the ground wheel to move rearwardly against the tension provided by the spring 80 until the rearward movement is halted by engagement with the limit stop 88. The tension of the spring also tends to hold the wheel in frictional engagement with the ground as it moves rearwardly until the limit stop is engaged, thus maintaining drive to the rod. As previously described, the limit stop 88 is adjustable and it will be appreciated that adjustment of the angle by which the lower part of the wheel assembly trails adjust the height of the wheel relative to the rod. Thus with the wheel running upon the surface of the ground, the rear part of the arm and the front part of the arm define effectively a rigid structure maintained in that rigid position by the cooperating forces of the downward pressure by the spring 36 causing the rearward pressure against the ground wheel holding it against the limit stop 88.

Should the rod or shank engage a rigid obstacle such as a rock, the ground wheel, rod and shanks are lifted from the ground over the rigid obstacle by the trip action previously described defined by the rear part 41 of the first portion of the arms. As the implement continues to move forwardly past the obstacle, the springs 46 will pull the rear part of the implement downwardly again into contact with the ground with the operation defined above being repeated in view of the return of the ground wheel to the forward position shown in FIG. 2 under the action of gravity and the spring 80. In this way the rod whenever it engages the ground is in a rotating condition which allows it to properly enter the ground and avoids the situation where the rod tends to skid over the ground which can occur if it is not rotating when it engages the ground.

As described in my previous patent, the use of a ground wheel in conjunction with the spring biasing forces pressing the ground wheel against the ground causes the arm to operate on a rigid structure so that the depth of the rod is properly controlled during the cultivating action. Thus there is less likelihood of the rod becoming exposed from the ground or attempting to go too deep in the ground since it is controlled effectively locally along its full length by the ground wheel associated with the rod.

In alternative arrangements (not shown) the attachment is provided with three shanks for supporting the rod. In this arrangement outermost ones of the shanks are substantially identical to the shank 54 and arranged at the ends of the beam 52. A central shank is substantially identical to the shank 56 acting as a drive shank for communicating a drive to the rod. Such an arrangement can be used with a wider rod in circumstances where a wider rod can be accomodated and its depth controlled by a central ground wheel arrangement. In a further alternative arrangement, the single ground wheel can be replaced by a pair of ground wheels mounted on the axle 83 but with the ground wheels on the outside of the legs 81 and 82.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tillage attachment device for mounting on an agricultural implement of the type comprising a tool bar, ground wheels for supporting the tool bar for movement across the ground and means for causing the tool bar to move in a direction transverse to its length, the device comprising clamp means for attachment of the device to the tool bar, pivot arm means mounted on said clamp means so as to extend rearwardly therefrom including a first portion extending from said clamp means so as to be pivotal about a horizontal axis at right angles to said arm means and a second rearward portion connected to the first portion at a rearward end thereof so as to extend downwardly therefrom, spring biasing means connected between said clamp means and said first portion of said pivot arm means for biasing said arm means downwardly around said axis, a ground engaging wheel having an axle mounted on said second portion of said arm means remote from said clamp means such that the ground wheel runs on the ground rearwardly of and following said tool bar, said ground wheel having a ground engaging periphery arranged to maintain said axle at a predetermined spacing from the ground, strut means rigidly mounted upon and extending transversely to said first portion of said arm means, two horizontally spaced rigid shank means each rigidly mounted on said strut means and extending downwardly therefrom for engagement with the ground, a rod extending between said shank means at respective lower ends thereof, the position of the rod relative to the ground being controlled by the height of the first portion of the arm means above the ground, bearing means mounting said rod on each of said shank means for rotation relative thereto about a longitudinal axis of said rod, drive means for communicating drive from said ground wheel to said rod for rotating said rod, means mounting the second portion of the arm means on the first portion for free pivotal movement about an axis parallel to said horizontal axis from a first forward position, in which the angle between the first and second positions is a minimum, in which the axle and ground wheel are at a forwardly most extent and in which the length of the shank means relative to the length of the second portion is arranged such that a lowest point of the periphery of the ground wheel is below a horizontal plane containing the rod, to a predetermined second rearward position in which said angle is increased such that the ground wheel is above said horizontal plane by a distance equal to a predetermined required working depth of the rod in the ground, limit means preventing movement of the second portion beyond said second position and means biasing said second portion toward said first position.

2. The invention according to claim 1 including means for adjusting said limit means to vary said predetermined working depth.

3. The invention according to claim 1 wherein said drive means comprises a first chain extending along said arm means from said ground wheel to said strut means and a second chain extending from said strut means along one of said shank means to said rod and including a drive shaft extending from said arm means to said shank means substantially along said strut means.

4. The invention according to claim 1 wherein said ground wheel includes an inflated rubber tire.

5. The invention according to claim 1 wherein said clamp means includes a spring receiving strut extending in a direction upwardly away from said arm means whereby said spring biasing means extends from said arm means to said strut.

6. The invention according to claim 1 including a single ground wheel only arranged substantially centrally of said strut means and symmetrically between said vertical shank means.

7. The invention according to claim 1 wherein said arm means comprises two elongate bars arranged in parallel spaced relation arranged inwardly of said vertical shank means and symmetrically about a central axis of said device.

8. The invention according to claim 7 wherein each of said bars includes a separate spring biasing means actuable between said bar and an upwardly extending strut on said clamp means.

9. The invention according to claim 1 wherein each of said shanks includes a portion thereof extending forwardly and downwardly of said bearing means, said shank portion including a removable point having a forward edge for engaging the ground and sides trailing the forward edge which cover said shank portion, said point being removable from said shank portion for replacement.

10. The invention according to claim 1 wherein one of said shank means encloses a drive chain forming part of said drive means for communicating drive from said ground wheel to said rod and the other of the shanks comprises a C-shaped member having an upper end thereof extending forwardly to said strut and a lower end thereof extending forwardly to said bearing means.

11. The invention according to claim 1 including cushion release means for allowing the rod to lift from the ground when engaging an object, the cushion release means comprising a rear part of the first portion of the arm means mounted on a forward part of the first portion for pivotal movement about an axis parallel to said horizontal axis such that the rear part, the second portion of the arm means, the ground wheel and the rod can pivot upwardly away from the ground, and spring means biasing the rear part in a downward direction around said pivot axis.

12. The invention according to claim 1 wherein said first portion of said arm means includes a pair of struts extending rearwardly from said strut means in parallel spaced relation, a cross strut joining said struts at a position rearward of said strut means, and wherein said second arm portion includes a pair of struts pivotally mounted on a cross member extending between said struts of said first arm portion, said axle being connected across a lower end of said struts of said second arm portion.

13. The invention according to claim 1 wherein one of said shanks comprises a housing mounted on said strut means at one end thereof, a chain wheel forming part of said drive means for communicating drive along said one of said shanks to the rod mounted in said housing, a strut supported by and extending downwardly from said housing and a channel member defining a front edge and two trailing sides, for covering a chain of said drive means, said channel member carrying said bearing means of said shank, said channel member and said strut including cooperable coupling parts at lower ends thereof whereby the channel member can be slipped onto the strut and bolted thereto for readily releasable connection to the housing.

* * * * *